(12) United States Patent
Brown

(10) Patent No.: US 8,979,430 B2
(45) Date of Patent: Mar. 17, 2015

(54) MOISTURE RESPONSIVE DEVICE AND METHOD

(75) Inventor: Michael E. Brown, Hull (GB)

(73) Assignee: Michael Edward Brown, Hull (GB)

( * ) Notice: Subject to any disclaimer, the term of this patent is extended or adjusted under 35 U.S.C. 154(b) by 1623 days.

(21) Appl. No.: 12/518,031

(22) PCT Filed: Dec. 7, 2007

(86) PCT No.: PCT/GB2007/004680
§ 371 (c)(1),
(2), (4) Date: Oct. 4, 2010

(87) PCT Pub. No.: WO2008/068496
PCT Pub. Date: Jun. 12, 2008

(65) Prior Publication Data
US 2011/0030275 A1   Feb. 10, 2011

(30) Foreign Application Priority Data

Dec. 8, 2006 (GB) .................................. 0624631.8

(51) Int. Cl.
*A01G 27/04* (2006.01)
*A01G 27/00* (2006.01)
(Continued)

(52) U.S. Cl.
CPC ............ *A01G 27/003* (2013.01); *A01G 25/167* (2013.01); *F16K 7/08* (2013.01); *F16K 31/001* (2013.01)
USPC ........................................... 405/37; 137/78.3

(58) Field of Classification Search
CPC .............................. A01G 25/167; F16K 31/001
USPC ............................. 405/37, 39; 137/78.2, 78.3
See application file for complete search history.

(56) References Cited

U.S. PATENT DOCUMENTS 3,204,872 A * 9/1965 Whear .......................... 137/78.3
3,273,849 A * 9/1966 Hansson ........................... 251/4
(Continued)

FOREIGN PATENT DOCUMENTS

FR    2 735 327 A   12/1996
GB    1 006 801 A   10/1965
(Continued)

OTHER PUBLICATIONS

Notification of Transmittal of the Internatioanl Search Report and the Written Opinion of the International Searching Authority, or the Declaration for International Application No. PCT/GB2007/004680 (Apr. 22, 2008).
(Continued)

*Primary Examiner* — Tara M. Pinnock
(74) *Attorney, Agent, or Firm* — Jenkins, Wilson, Taylor & Hunt, P.A.

(57) ABSTRACT

A moisture responsive device is described having a moisture responsive element comprising at least a moisture responsive formation of a first material in association with a less moisture responsive formation of a second material, in that the first material has a greater tendency to absorb moisture and to increase in volume as a result than the second material, the two formations being so mechanically arranged together that such swelling tends to cause mechanical deformation of the moisture responsive element; and an actuation member optionally of flexibly resilient material in mechanical association with the moisture responsive element so that distortion of the moisture responsive element in the presence of moisture tends to mechanically distort the actuation member and thereby cause the actuation member to change between at least a first functional state and a second functional state. A method of use, especially in irrigation control, is also described.

27 Claims, 5 Drawing Sheets

(51) Int. Cl.
*A01G 25/16* (2006.01)
*F16K 7/08* (2006.01)
*F16K 31/00* (2006.01)

(56) References Cited

U.S. PATENT DOCUMENTS

| | | | | |
|---|---|---|---|---|
| 3,426,539 | A | * | 2/1969 | Whear ............... 405/37 |
| 3,900,135 | A | * | 8/1975 | Stephens ............ 222/52 |
| 4,121,608 | A | | 10/1978 | MacLeod |
| 4,182,357 | A | | 1/1980 | Ornstein |
| 4,214,701 | A | | 7/1980 | Beckmann |
| 4,577,997 | A | * | 3/1986 | Lehto et al. ........ 405/43 |
| 4,696,319 | A | | 9/1987 | Gant |
| 5,382,270 | A | | 1/1995 | Graham et al. |
| 5,707,038 | A | | 1/1998 | Cocatre-Zilgien |
| 5,794,848 | A | | 8/1998 | Nunn et al. |
| 7,506,658 | B2 | * | 3/2009 | Guest et al. ........ 137/78.3 |
| 2002/0124880 | A1 | | 9/2002 | Tanikawa |
| 2006/0016478 | A1 | | 1/2006 | Chantalat |

FOREIGN PATENT DOCUMENTS

| | | |
|---|---|---|
| GB | 2 017 868 A | 10/1979 |
| WO | WO 03/013220 A2 | 2/2003 |
| WO | WO 2008/068496 A1 | 6/2008 |

OTHER PUBLICATIONS

Search Report under Section 17 for Application No. GB0624631.8 (Mar. 7, 2007).

* cited by examiner

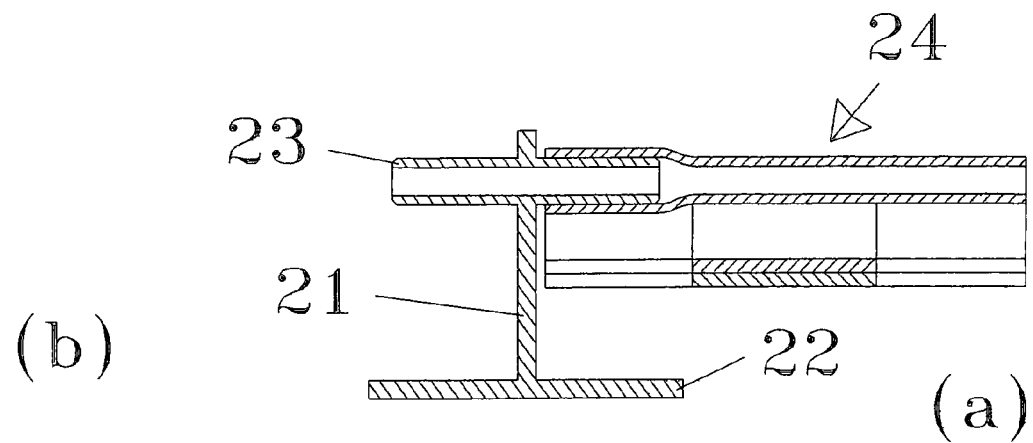
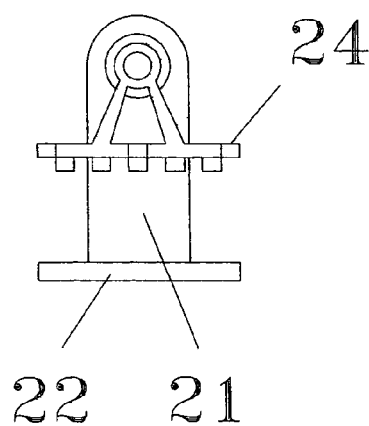
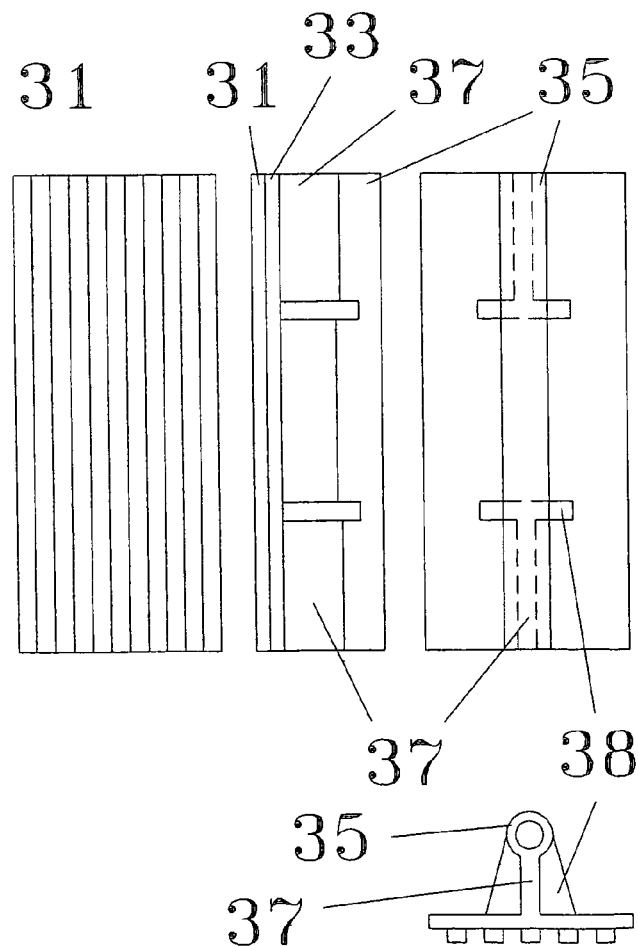
Fig 5
Fig 6

MOISTURE RESPONSIVE DEVICE AND METHOD

The invention relates to a device which exhibits a moisture response, in particular to change between a first state and a second state mechanically to perform an operation, for example to serve as a moisture operated valve, switch, sensor or the like, and to a method of use of the same. In a preferred embodiment the invention relates to a device and method for regulating irrigation of a growing environment for example to limit the under-watering and over-watering of one or a number of plants, vines, shrubs, trees and the like in the growing environment, either indoors or outdoors, which incorporates an automatic response means responsive to levels of moisture in the environment, in particular composed as an automatic response valve means. The invention, and the prior art, are largely discussed in this preferred context, but the more general applicability of the invention will be understood.

It is common to grow ornamental plants and agricultural species in containers of soil, growing medium, etc, either in-doors, or outdoors in cold-frames, poly-tunnels, greenhouses or set out, to acclimatize, in the open-field. Such potted plants require varying amounts of watering depending on the type of plant, size, rate of uptake, humidity, air flow around the foliage, drainage through the container soil and evaporation losses, if any, through the container wall.

With the exception of indoor plants close to furnishings, sprinkling or hosing these potted plants, either from above or below, either manually or automatically from a centralised watering system on a regular basis with sufficient excess to permit runoff, can be evidenced as common practice when there exists an abundant supply of tapped or piped water. However, this can be wasteful.

In the case of potted plants 'indoors', where excess water runoff cannot be tolerated, as this would damage home and office furnishings, it is necessary to regularly water potted plants on an individual basis, and this is most often done manually. It is known that a number of automated timer-controlled watering systems, and others incorporating electronic-moisture sensors, are commercially available which supply water to one or more potted plants via a multiple Tee'd-off distribution hose or system. The droppers from each of the Tee's may be either plain open-bore or terminate in a throttle device which can be manually adjusted to provide anything from a slow drip, drip feed to a trickle feed to suit each pot or container. There is another reason for incorporating throttles in each dropper in a long delivery system. This is to balance out the differing outflows that will occur along the length of the multiple Tee'd off supply hose.

Throttled droppers though are prone to blockage especially in hard water areas or where the water contains other matter. Open-bore droppers are simpler and rarely become blocked but these cannot be adjusted to cater for differing plant needs, or to compensate for their distance from the source of supply, without changing the bore size, and so are preferably employed where plants are watered from a central timer-based system and have a similar watering requirement—and where provision is made for any run-off to be channeled away safely.

At best these two approaches suffice for a short period of time before manual intervention becomes necessary, to either increase or reduce the water being supplied to one or more of a set of plant containers. Both systems once activated will supply water at their predetermined rates irrespective of the changing needs of each plant which changes might be brought about by fluctuations in the weather, e.g., sunlight, heat, cold or simply from plant growth. Plants can be starved of water from blocked dripper valves or become over-watered and die. In the extreme, over-brimming of containers or trays can occur, resulting in water-damage to furnishings, etc.

In the case of field planting e.g., for agricultural or horticultural crop production, especially in hot arid regions and where the topsoil and subsoil strata are variable and undulating, surface water losses due to evaporation and to the varying depths of the water table—when this is present, can cause dramatic localised variations in ground-moisture availability and crop production. These can be seen from aerial views of orchards and fields, sometimes on a plant by plant basis.

Where water is a scarce resource this precludes the regular use of classical irrigation where each square meter of ground regularly receives the same amount of water and can be deluged until run-off occurs. Of particular interest here are mountainside vineyards where trickle irrigation from droppers or soaker-tubing irrigation technology can only be said to work over the range of micro-ground conditions when a surplus of water is employed—i.e., more than is needed by the majority of plants for their healthy development—to ensure that the driest areas receive adequate water.

Further to this there is a scientifically based minimum oxygen requirement for the roots of many land based plants and this can be compromised if the root bundle and soil, potted or otherwise, becomes water-logged for too long a period. Many plant species, as is evidenced in nature, benefit from successive water-inundations followed by drier periods where oxygen can again be present in the soil and around some or all of the roots.

Various devices are known which attempt to regulate delivery of water in situ in a more dynamically responsive manner.

U.S. Pat. No. 4,121,608 to MacLeod filed 14 Feb. 1977 'Liquid metering device' describes a pinch valve activated by a moisture responsive element. The moisture responsive element is elongated and preferably buried in the soil close to where the regulated watering is required.

Starting from a dry soil condition and a fully open valve the valve passes water into the soil and from this progressively closes to form one or more pinch lines across the resilient tubing. As a consequence there is no fluid flow when the moisture responsive element expands to its ultimate closed position. As the soil dries out and in turn the moisture responsive element dries out also and shrinks, the pinch is incrementally released and with this the fluid flow resumes incrementally.

It will be seen from this arrangement that the valve will experience periods of restricted flow for the periods during which it is opening and closing. There is the likelihood that the valve will pass sufficient fluid, over time, during one or both of these partial states as to, never achieve its full unrestricted open-bore again. Unrestricted full-bore flow is deemed essential, at least from time to time, for a valve to self-purge accumulations of materials, e.g. biological matter, hard water deposits, grit, sand, etc. which might have entered from one or both ends of the irrigation device.

Because of the relatively long moisture responsive element, this valve is not readily adapted to being attached to the free end of an irrigation tube which is terminated in the basal watering dish or tray of a pot plant. This is an important requirement for pot plants which need to be watered, from the bottom. The configuration and method of use, i.e., pressed into the soil, gives rise to a considerable difference between the valve closing time and subsequent valve opening time, i.e., there is an inherent hysteresis effect.

U.S. Pat. No. 4,182,357 to Ornstein filed 2 Mar. 1978 'Method of controlling the relative humidity in a soil environment and apparatus for accomplishing same' describes an essentially short fat version of a pinch valve incorporating a moisture responsive element enclosed in a partially open housing. This configuration though better suited to basal watering, squat-like, is compromised similarly when it too is in a partially open and partially closed state. The semi-enclosed nature of the housing is known to inhibit the rate of drying out of the moisture responsive element giving rise to a delay in the subsequent opening up, even partially, of the fluid passageway. This gives rise to a considerable difference in the time to open the valve as compared with closing the valve by the action of moisture alone, i.e., a hysteresis effect similar to that of the earlier MacLeod device.

U.S. Pat. No. 4,214,701 to Beckmann filed 28 Aug. 1978 'Irrigation valve device' describes an 'adjustable' pinch valve of similar geometry to the earlier MacLeod valve and with the same drawbacks. The moisture responsive element in this valve is shown as either being partially encased in an open housing, and forming the expansible core along the main axis of the valve assembly, or in a second embodiment shaped to surround and slide over a centralised non-expansible pin core. As with the two previous examples both of these new assemblies call for unrestricted relative movement between the two parts, in the order of several millimeters, between the material comprising the moisture responsive element and the non-expansible pin or open lattice housing in contact with a soil environment. These configurations both exhibit hysteresis effects similar to that of the earlier MacLeod device, i.e., the time profiles differ considerably between the valve opening and valve closing half-cycles.

U.S. Pat. No. 5,382,270 to Graham et al. filed 9 Sep. 1995 'Plant growth media comprising cross-linked hydrogel particles' describes a minimal displacement, diaphragm, end-stop valve incorporating a moisture responsive element. This compact arrangement appears at first sight to be suited to the basal watering of pot plants standing in their shallow trays or dishes. However the water pathway inside the valve is contorted and lacks the essential requirement of a straight-through, full-bore fluid path. This valve is prone to malfunctions arising from biological invasions, hard water deposits and unwanted in-line debris which can enter from one or both ends of the device. Also, since the moisture responsive element is partially encased within a housing, this valve exhibits a hysteresis effect similar to that of the earlier MacLeod device.

U.S. Pat. No. 5,794,848 to Nunn et al. filed 30 Dec. 1994 'Hygrostat and system' also describes a minimal displacement, diaphragm end-stop valve incorporating a moisture responsive element with a similarly contorted internal configuration to Graham. However this valve, intended to be pressed into the soil, is not suited to a basal tray watering application. Yet again the moisture responsive element is partially encased within a housing, so that this valve also exhibits a hysteresis effect similar to that of the earlier MacLeod device.

U.S. Pat. No. 5,707,038 to Cocatre-Zilgien filed 23 Oct. 1996 'Hinged kink valve' describes a mechanically opened and closed kink valve used for example for the control of pneumatic actuators in a walking robot assemblage. This patent is cited as evidence of the viability of this type of valve even to control the passage of fluids under pressure. The valve comprises an assembly of parts of which one component is a semi-rigid polymeric tubing hyper-flexed until its material has yielded in an irreversible manner and created a kink. Ulterior flexions of the tubing tend to occur about the preferred axis set by the kink. In the example cited the operational opening and closing of the passageway through the polymeric tubing is brought about by the application of externally applied mechanical means.

US Patent Application Publication No. US 2002/0124880 A1 to Tanikawa filed 7 Mar. 2001 'Irrigation valve' describes a type of elongated pinch valve and also a water-tap type of stop valve, both types being activated by a moisture responsive element. In the first instance, FIGS. 1(a) and 1(b), the pinch valve is of the type: U.S. Pat. No. 4,182,357 Ornstein (refer FIG. 2) with the same partially open and partially closed characteristics. In the second instance the stop valve configuration resembles U.S. Pat. No. 5,382,270 to Graham et al., a diaphragm end-stop valve, wherein the same partially-open and partially-closed characteristics are present. Likewise the moisture responsive element is partially encased within a housing; as a consequence the device suffers from a similar hysteresis effect to the earlier MacLeod device.

US Patent Application Publication No. US 2006/0016478 A1 to Chantalat filed 21 Jul. 2004 'Bending sleeve clamp for controlling fluid flow in a flexible tube' describes a deformable sleeve arrangement which encloses a resilient fluid delivery tube. In the fully open condition the delivery tube is essentially straight within the essentially straight and elongate sleeve. To shut off the passage of fluid the sleeve is progressively deformed mechanically towards a 90 degree arrangement during which time a kink is formed in a thin walled region the sleeve at a predetermined position within the generally central region. This has the effect of forming a pinch point in the delivery tube cutting off the passage of fluid. In this type of valve the means of producing the opening and closing are mechanically derived by external means. Also, the sleeve is essentially a sliding fit over the resilient delivery tube. It will be apparent to one skilled in the art that, were the sleeve, in its use, to be a tight fit around the delivery tube, a sufficiently long central region of the sleeve could be omitted, enabling the delivery tube to freely, form its own kink within the open free space between the opposing ends of the sleeve arrangement.

In the Prior Art cited there is clear evidence as to the effectiveness, in cutting off the flow of a fluid, of a pinch valve. However for the pinch valve examples where this motion is derived from the expansion of a partially-encased moisture responsive element, the drying out time and associated opening time of the fluid delivery tube will be delayed, i.e., there will be a marked hysteresis effect between the half-cycles of wetting-up and drying-out. Thus a valve which might go from full-bore open to completely cutting-off the flow of a fluid in under two hours, might take many more hours or even days to return to its fully open, i.e., dried out state, again. This of course will only be possible if the moisture responsive element is kept away from any further moisture inundation—a state which is not likely to occur if the valve is fitted to the delivery end of a constant head irrigation supply and less likely still if much of the moisture responsive element is below soil level.

Crucially these Prior Art watering devices, when employed in conjunction with a continuous supply of irrigation fluid, will tend to be biased towards cycling narrowly between some partially-open state and their closed-off state. As a consequence even minor in-line debris will be capable of accumulating and causing a fluid flow restriction. When used in conjunction with irrigation timers set to switch on and off periodically, i.e., where water may be switched-on for perhaps only one hour in every twenty-four hours, the slow incremental re-opening of these valves, from their tightly-closed position may overlap the timer cycle so that a plant in urgent need of water misses a watering opportunity. This may be exacerbated when in-line debris accumulates to partially clog up the nip zone. The motion of these prior art devices is often virtually imperceptible to the human eye and very sluggish. Given a free-choice a designer skilled in the art would not select this type of motion for a water irrigation valve. A preferred motion would have a snappier action and more closely resemble the positive opening and closing of an electrical micro-switch.

However, some of these problems also exist in relation to moisture responsive devices which, rather than being directly actuatable valves, constitute moisture actuated sensors and/or switches, for example electronic sensors and/or switches, based on similar principles, where the fundamental underlying moisture response is effected by relative distortion of a hygroscopic or otherwise moisture absorbent material. Thus, although the invention is discussed primarily in the context of devices where such a distortion produces a direct mechanical "valve" effect, it will be understood that the same principles could be applied for example where the mechanical distortion is employed indirectly to produce a sensor detection or switching effect, and in particular to generate an electrical sensor signal and/or actuate an electrical switch.

It is desirable to provide a moisture responsive device, and a method of use of the same making use of a moisture responsive means in which at least some of the above disadvantages are mitigated, and which in particular exhibits one or more of the following advantages:
improved response to changing moisture levels both in its opening half-cycle and in its closing half-cycle;
more close matching of the two-half cycles;
fewer complex moving parts and a reduced chance of mechanical fouling and failure in use.

Thus, in accordance with the invention in a first aspect there is provided a moisture responsive device having:
a moisture responsive element comprising at least a moisture responsive formation of a first material in association with a less moisture responsive formation of a second material, in that the first material has a greater tendency to absorb moisture and to increase in volume as a result than the second material, the two formations being so mechanically arranged together and for example intimately connected together that such differential change in volume tends to cause mechanical deformation of the moisture responsive element; and an actuation member in such mechanical association with the moisture responsive element that deformation of the moisture responsive element in the presence of moisture tends to mechanically change the actuation member between at least a first conformational state and a second conformational state and thereby cause the actuation member to change between at least a first functional state and a second functional state.

The key to the invention is that the actuation member is caused to change mechanically between at least a first conformational state and a second conformational state under action of the moisture responsive element which change is reversible with the reversible deformation of the moisture responsive element as moisture levels vary. Examples of changes in conformational state include changes of shape and/or position and/or orientation and/or size of the actuation member and/or of parts thereof.

The actuation member is so constructed that these changes are caused as the moisture responsive element deforms. The actuation member may achieve this change in conformational state by having a reversibly changeable and for example reversibly deformable structure, whether through provision of suitable mechanical features such as articulations or by suitable material selection or by some combination. In one embodiment the actuation member is adapted to deform between a first and a second shape.

Preferably the moisture responsive device is structured and/or is fabricated from materials selected to be resiliently deformable to be adapted to cycle on multiple occasions between at least the first and the second conformational states as moisture conditions change. In a convenient preferred embodiment the actuation member is a flexible actuation member, for example formed of a flexibly resilient material, and the said mechanical change in the actuation member caused by deformation of the moisture responsive element is such as to cause the actuation member to flex between at least a first functional state and a second functional state in a manner in which it allows it to return resiliently to its previous state as the moisture responsive element returns to its previous state. Thus, the change of the actuation member between at least a first conformational state and a second conformational state constitutes a mechanical distortion of the actuation member which thereby causes the actuation member to change between at least a first functional state and second functional state.

The invention thus lies in the very simple combination of a moisture responsive element which deforms inherently as moisture levels vary and an actuation member which is mechanically coupled to this element in such a manner that this deformation tends to act mechanically upon the actuation member, and for example to introduce distortions or directional changes such as bends or kinks into the actuation member. The actuation member is so configured that this mechanical change and for example distortion of the actuation member causes it to change between first and second conformational states in such a manner as to initiate a desired effect either directly within the actuation member or by effecting transmission of a signal from the actuation member. In particular, the actuation member thus effects a change between at least a first and at least second state, which change may be either analogue and progressive or digital and discontinuous, as the moisture responsive element deforms. The change is reversible as the deformation of the moisture responsive element reverses with changed moisture levels. In this way, the device of the invention acts as a moisture operated switching means in the general sense, in that a detectable and optionally directly functional state change is induced in an actuation member as the moisture conditions change.

In a particularly preferred application, the moisture actuated switching action provided by the conformational change and resultant change in functional state of the actuation member is intended to be or form a part of a moisture actuated closure for a fluid conduit system, and for example thus an automated moisture actuated closure for an irrigation system. The device preferably includes an operable closure formation, actuatable by and for example including or constituted as a part of, the actuation member. That is to say, the device is so configured that the functional change in an actuation member effects selective operation (i.e. selective opening and closing in a moisture responsive manner) of the operable closure formation and, in a preferred embodiment, the actuation member is, or constitutes at least a part of, the operable closure formation so that the functional change directly effects at least in part operation of the operable closure formation.

The device of the invention lends itself particularly to this mode of operation, in accordance with a preferred embodiment, wherein the flexibly resilient elongate actuation member is a flexibly resilient conduit member serving as a portion of a fluid transfer conduit which is directly deformable as the moisture responsive element deforms to introduce directional changes such as bends or kinks in the flexibly resilient conduit, and thereby to tend to occlude a fluid channel within the conduit and so inhibit fluid flow therealong. Thus, the actuation member itself constitutes a closure formation. Subsequent discussion of embodiments of the invention will focus on such examples.

It will be understood however that the principles of the invention can be applied to any switching system whereby it is desired to produce a reversible state change from one state to another in the actuation member as the moisture level changes at the device and effects deformation of the moisture responsive element. For example, an application can be envisaged as an electrical moisture sensor or moisture actuated switch wherein the elongate actuation member includes a conductor or conductors, piezoelectric material, or any like functionality so as to generate an electrical signal and/or change conditions in an electronic circuit of which the device forms a part as the moisture responsive element deforms and the actuation member correspondingly deforms or otherwise changes between the first and second conformational state. Thus, the principles of the invention can be applied to any system of moisture sensor or moisture activated switch where a mechanical distortion or conformational state change of the elongate functional member can effect actuation of the sensor or switch.

However, in accordance with the invention in a preferred embodiment there is provided a device for regulation of irrigation comprising a moisture responsive element comprising at least a moisture responsive formation of a first moisture responsive material in direct mechanical association with a less moisture responsive formation of a second less moisture responsive and for example relatively unresponsive and/or hydrophobic material, in that the first material has a greater tendency to absorb moisture and to increase in volume as a result than the second material, the two formations being so mechanically arranged together that such differential change in volume tends to cause mechanical deformation of the moisture responsive element; and a fluid conduit of flexibly resilient material in such mechanical association with the moisture responsive element that deformation of the moisture responsive element in the presence of moisture tends to mechanically distort the fluid conduit to introduce one or more kinks therein and thus to inhibit fluid flow.

The preferred embodiment thus provides a simple combination of a moisture responsive element which distorts inherently as moisture levels vary and a flexibly resilient conduit, such as an elongate tubing or the like, which is mechanically coupled to this element in such a manner that this distortion tends in use to introduce directional changes such as bends or kinks into the conduit. By virtue of the nature of the conduit, such directional changes are likely to constitute flow restrictions in a conduit bore, and to tend to inhibit the passage of fluid through the conduit bore.

For example, in a usual mode of operation of this embodiment, a conduit, preferably in the form of a flexibly resilient tubular member, with a tube bore acting as a passage for irrigation fluid in use, will be so constructed that the conduit member lies generally straight in a generally dry and open-bore state, but is caused to become kinked, resulting in at least partial closure of the bore, under the mechanical action of the moisture responsive element as the more moisture absorbent first material swells.

The invention is therefore very mechanically simple, with essentially no moving parts. It responds to the environmental moisture levels, tending to effect actuation of the actuation member and in the preferred embodiment close the fluid conduit and for example the tube bore and prevent further watering, on the basis of the automatic response created by mechanical deformation of the moisture responsive element.

This is effected in an admirably simple manner, by exploiting the differential physical absorption properties of the two materials, and in particular selecting those two materials such that the first material tends to absorb moisture and increase in volume in a wetter state to a greater extent than the second material.

The materials expand differentially as moisture levels change. For example one material expands as it absorbs moisture, and the other material exhibits relatively little expansion. For example, the first material is a relatively hygroscopic material, and the second material is a relatively less hygroscopic material, and is for example a relatively hydrophobic material.

Preferably the moisture responsive device is resiliently deformable to be adapted to cycle on multiple occasions between at least the first and the second conformational states as moisture conditions change. For example the moisture responsive element is resiliently deformable. Conveniently at least the relatively inexpansive second material is resiliently deformable to deform as the first material expands and revert to its original configuration as the first material contracts, so that the moisture responsive element deforms reversibly without excessive build up of stresses between the two materials and prolongs device lifetime. The first material is conveniently also resiliently deformable. For example, a resiliently deformable material is an elastomeric polymer.

The two materials are mechanically arranged together that such differential swelling of the two formations tends to cause mechanical deformation of the moisture responsive element. In particular the two materials are preferably intimately connected together. In particular they are conveniently mechanically engaged together, for example directly by a shared bonded surface. The shared surface may be bonded adhesively, thermally or mechanically, but is preferably bonded in that at least one of the materials is laid down on the other via a melt forming process. For example at least one of the materials is laid down on the other by over moulding, or the two materials are comoulded or coextruded. This gives an intimate contact better able to resist the forces generated as the two formations are differentially distorted in use.

Whilst the invention is described in its simplest in terms of two materials with differential properties to make up the moisture responsive element, the invention is not so limited, and any number of materials may be used provided there is at least a moisture responsive formation of a first material with relatively higher moisture absorption and exhibiting a relatively high volume change relative to a less moisture responsive formation (for example a substantially moisture invariant formation) of second material with relatively lower moisture absorption and thus exhibiting a relatively lower volume change with which it is so mechanically engaged that the element undergoes a shape change deformation between a relative dry and a relatively wetted state, and that this deformation is such as to create a change in state in an actuation member, and for example distort a flexibly resilient actuation member such as a fluid conduit, which may be of the same second material or comprised of a third material, in mechanical association with the element in such manner as to tend to actuate the actuation member and for example close a conduit passage to the through transfer of irrigation liquid.

In a particularly convenient embodiment, the moisture responsive element has a generally flat structure (that is, web-like or sheet-like structure), with the first and second materials being so arranged that it tends to distort, preferably primarily in one general curvature direction but optionally in both sheet directions, between a generally less curved and for example planar formation and a generally more curved formation. In particular, the element is configured such that it adopts a generally planar formation in an unwetted state, and tends to curve as it is wetted. This is conveniently achieved in that the first material and the second material are essentially disposed alongside one another and mechanically engaged and for example bonded directly together, such that the increased tendency of the first material to absorb moisture and increase in volume will tend to leave the first material, in the distorted and extended wetted state, on a convex side of the said curved surface, and the second material, which material can preferably be elastically-stretched in the process by the action of the first material, on a concave side of the said curved surface.

This arrangement lends itself particularly conveniently to ensuring that the actuation member, for example a fluid conduit such as a tubular member, is acted upon and distorts in a predictable manner as the sheet-like moisture responsive element deforms and changes shape from a relatively flat to a relatively curved configuration. The actuation member is placed in mechanical association with a surface of the second material of a sheet-like moisture responsive element which is such as to deform to be the concave surface during use being located either on the surface or spaced away from and for example generally parallel to it. The resultant deformation to a curved shape tends to reduce the length available for a given length of actuation member on the concave side, and to introduce mechanical stresses such as to produce the changes in conformance state and for example the distortions such as to generate a desired actuation response, and in particular in the case of tubular conduits and the like to introduce direction changes and especially sharp direction changes or kinks which act directly to tend to inhibit flow.

Preferably, rather than disposing the actuation member directly on the said surface, the actuation member, for example a conduit member comprising a flexibly resilient tubular member, is mechanically engaged upon but laterally distanced or offset from a moisture responsive element and for example the said surface by lateral engaging projections. Preferably, the projections extend generally transversely between an elongate direction of a moisture responsive element and a typically generally parallel elongate direction of an actuation member. For example the projections extend generally perpendicularly therebetween. Preferably, at least a pair of such projections is provided spaced apart in a longitudinal direction along the elongate actuation member. This arrangement projects the actuation member such as the flexibly resilient tubular member to such a point where, with the element in the deformed, curved state, a lesser degree of curvature in the moisture responsive element generates the necessary forces in the actuation member sooner than would be the case if the actuation member was mounted directly on the surface to create the same desired deformation, and for example a kink. It also tends to define a preferential deformation zone where a controlled deformation such as a kink in the flexibly resilient tubular member is much more reliably generated. Supporting the actuation member at two longitudinally spaced points tends to define a kink zone between these two points, and especially generally at the mid point between the two points, where deformation will preferentially occur.

In a preferred embodiment, the moisture responsive element comprises at least a bilayer in which at least a first layer or web of the said first material is mechanically associated with at least a second layer or web of said second material. Conveniently, such a bilayer is formed by a continuous process, for instance by co-forming from two web stocks via an adhesive or other web joining methodology, by co-extrusion, or via any other suitable formation process. Preferably, the forming process additionally co-forms the actuation member such as the conduit with the moisture responsive element. In this way, a continuous supply of material may be formed which can be, further processed to remove unwanted material, i.e. die cut-outs from the projection(s) and perforations to improve air flow if these are required, and cut to desired lengths to serve as individual moisture responsive irrigation control devices in accordance with the invention.

The preferred application of the device of the invention, and in particular of the preferred embodiment including a tubular conduit, as an irrigation control device in a practical irrigation system, whether indoors or outdoors, and whether for domestic gardening or commercial horticulture or agriculture, can be readily understood. At its simplest, the device of the invention is adapted to undergo a reversible conformational change and for example distort in the presence of moisture to a point where, once a certain degree of distortion is reached, a control signal can be generated to control irrigation. In effect, the actuation member generates a switching effect to switch an irrigation flow on and off. This may be indirect, in that the actuation member generates a moisture sensor signal which is used by control means to control irrigation, or direct in that the actuation member serves as part of a mechanical, electromechanical, or electrical valve or valve switch arrangement that closes as moisture levels rise. In the preferred embodiment, the actuation member is a fluid conduit that is so distorted as to inhibit fluid flow within the conduit. The conduit is therefore in itself in effect a valve means that actuates automatically as moisture levels change. Alternatively, switcher actuators, such as wire connectors, may be disposed within the conduit.

Clearly, such a device can serve in practice as a moisture responsive valve means within an irrigation system, with a device in accordance with the invention fitted in an irrigation liquid distribution line, typically in the vicinity of a site where irrigation liquid is to be delivered, and thus respond to in situ conditions and selectively allow or inhibit further watering.

The device or multiples thereof may be employed in a first application when plants, vines, shrubs, trees and the like are irrigated on mass via a distribution network of irrigation hoses fed ultimately from a source of either constant-head or fixed-volume irrigation fluid. In a second application the device or multiples thereof may be employed in conjunction with a timer based irrigation fluid system which is set to initiate either a time-based or volume-based periodic outflow from a source of irrigation fluid. In either instance, the simple valve in accordance with the invention should prevent overwatering by detecting in situ when moisture levels are relatively high (in that the moisture responsive element will then be distorted) and acting in effect as a valve closure in such circumstances (in that the distortion of the element will introduce the necessary distortion of the conduit to cause partial or complete closure thereof, and inhibit further irrigation fluid flow). The valve mechanism is dynamically responsive, and fully reversible. The absence of mechanical moving parts improves reliability and lifetime. Further, the "valve" is entirely closed to the environment, in that it merely comprises a reversible distortion in the tubular member or other conduit, and so there is no tendency to environmental fouling of the "valve" mechanism.

The invention in a preferred aspect is thus a moisture responsive valve comprising a device in accordance with the foregoing, an operable valve closure, and a means to open and close the valve selectively on actuation of the actuation member. In a further aspect the invention therefore provides an irrigation system including at least one and preferably a plurality of such moisture responsive valves as above described.

However, in the alternative the principles of the invention may be employed, for example, in a moisture responsive sensor comprising a device as above described and a means to generate a moisture responsive signal on actuation of the actuation member, or in a moisture responsive switch comprising a device as above described, an operable switch for example comprising a pair of electrical contacts in familiar manner for connection to an electrical circuit, and a means to open and close the switch selectively on actuation of the actuation member.

Any suitable known operable valve closure, signal generation means, or operable switch can be incorporated with the basic device of the invention to give the desired functionality.

In accordance with the invention in a further aspect, a method of detecting and/or responding to changes in moisture levels in situ in an environment comprises disposing at least one and preferably a plurality of devices in accordance with the first aspect of the invention in an environment as part of a system designed to monitor and/or control moisture levels in the environment; operating the system over time in such manner that as changes in the moisture levels actuate a change of state in the device in accordance with the first aspect of the invention a response is generated in the system.

The response may merely be observational (i.e. the device acts as a sensor) or may involve an operational response. In a preferred embodiment the response method includes taking steps to alter the moisture level in situ, for example to bring it back towards a desired predetermined level. Preferably, the device itself is configured to effect this, as a switch or valve actuator, and in particular as a valve as above described.

In accordance with this embodiment the method is a method of controlling an irrigation system comprising the steps of: providing an irrigation system comprising a network of irrigation hoses or the like fed from an irrigation fluid source or modifying such a network already existing in situ; incorporating into the network, in particular in the vicinity of one or more irrigation fluid delivery points, at least one device in accordance with the first aspect of the invention so as to act as a valve actuator, and preferably comprising as an actuation member a fluid conduit of flexibly resilient material in such mechanical association with the moisture responsive element that distortion of the moisture responsive element in the presence of moisture tends to mechanically distort the fluid conduit to introduce one or more kinks therein and thus to tend to inhibit fluid flow at higher moisture levels; operating the irrigation system as desired by supplying irrigation fluid from the source to the network of hoses.

In accordance with the embodiment of the method, the use of the inventive device in situ at least one, and preferably at a plurality and for example all, of the irrigation fluid delivery sites in the system, irrigation is only delivered at those sites where it is needed when supplied from the central source. At those sites where moisture level is already relatively high, the device distorts and tends to close the valve/conduit. The valve/conduit is fluidly connected into the hose in the vicinity of the delivery point, and thus acts as a closure to the hose delivering irrigation fluid to that delivery point. Delivery points which deliver to sites that are already sufficiently watered are thus selectively closed in accordance with the method.

The irrigation source may supply irrigation fluid either on a constant-head or fixed volume basis, or on a time-based or volume-based periodic basis in familiar manner.

Precise control can be less critical however, since the use of the method of the invention limits a tendency to over-watering and to under-watering by selectively closing off those sites which are already sufficiently watered and by opening again more quickly and providing a viable opportunity for the further supply of water.

Irrigation fluid will typically be water, optionally including suitable horticultural or agricultural additives, such as a plant feed compositions or the like, water conditioning compositions such as pH control compositions and the like, in conventional manner.

The invention will now be described by way of example only with reference to FIGS. 1 to 6 of the accompanying drawings in which:

FIG. 5 shows an alternative mounting option in sectional side view and end view for a device of FIG. 3;

FIG. 6 shows an alternative embodiment of similar device in plan, side, underside and end elevation.

Figure 1:
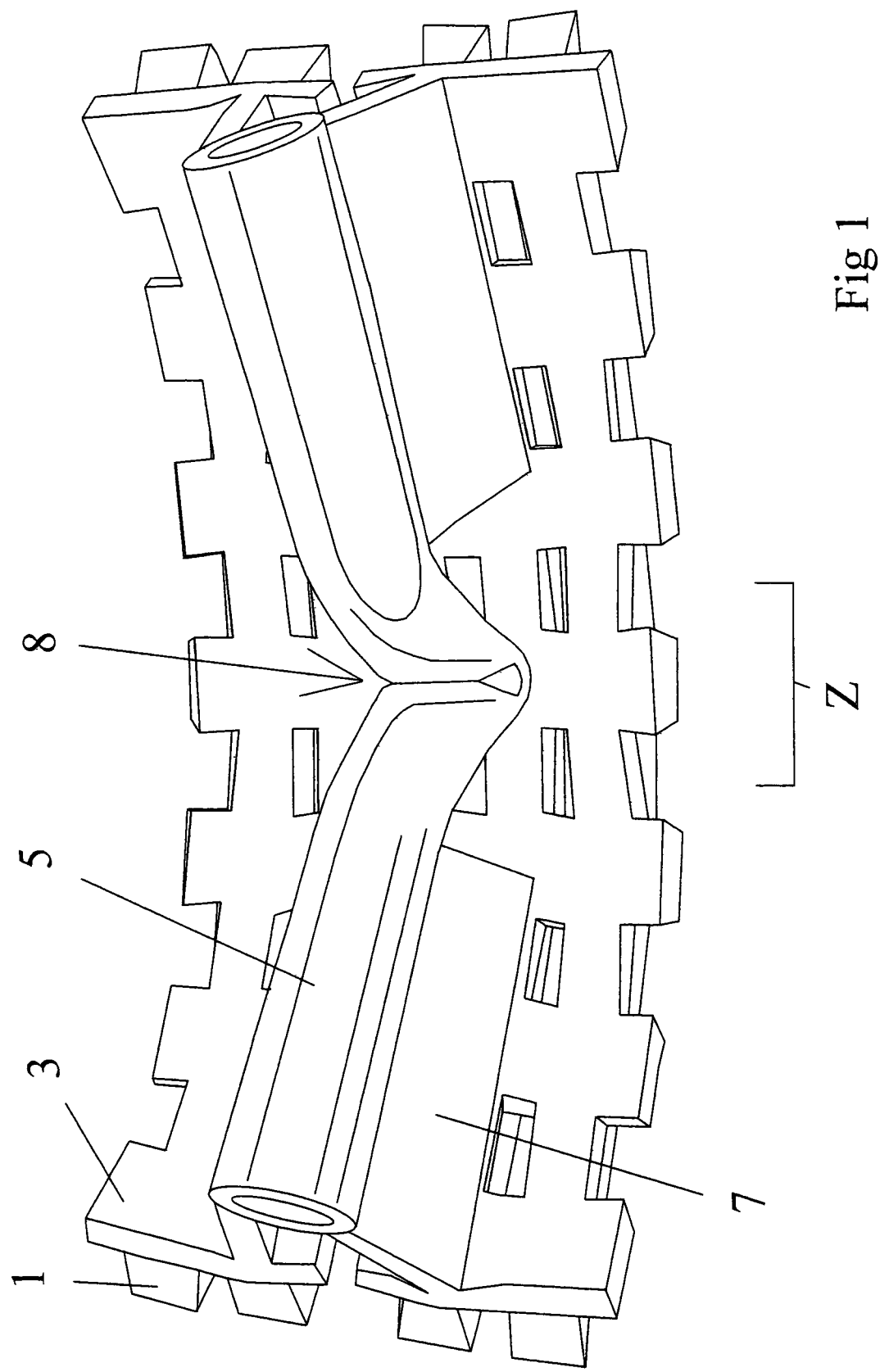
FIG. 1 is a perspective view from a concave side in an actuated state of a moisture actuated tube closure in accordance with the principles of the invention.
Figure 2:
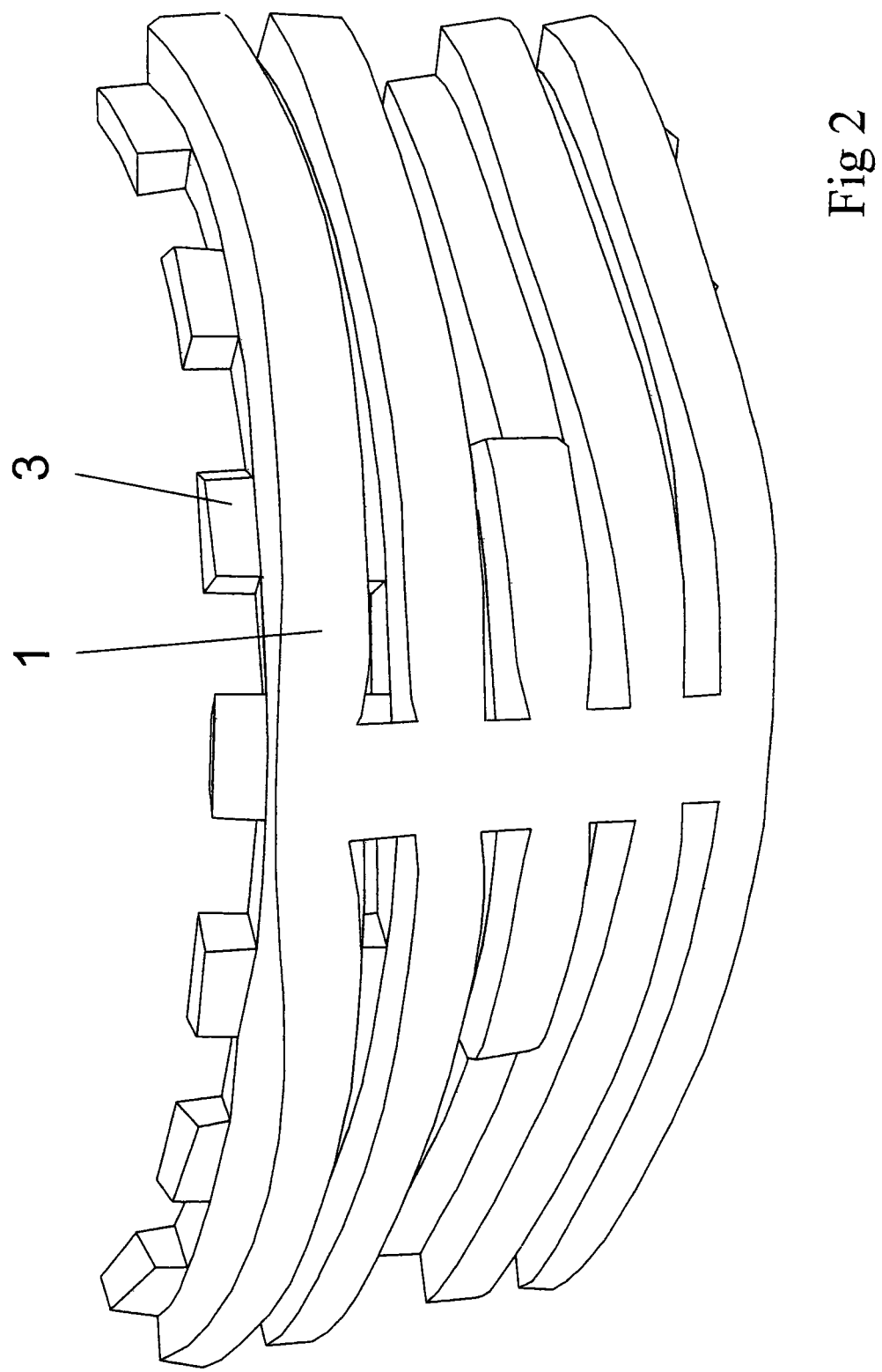
FIG. 2 is a perspective view of the same from a convex side.
Figure 3:
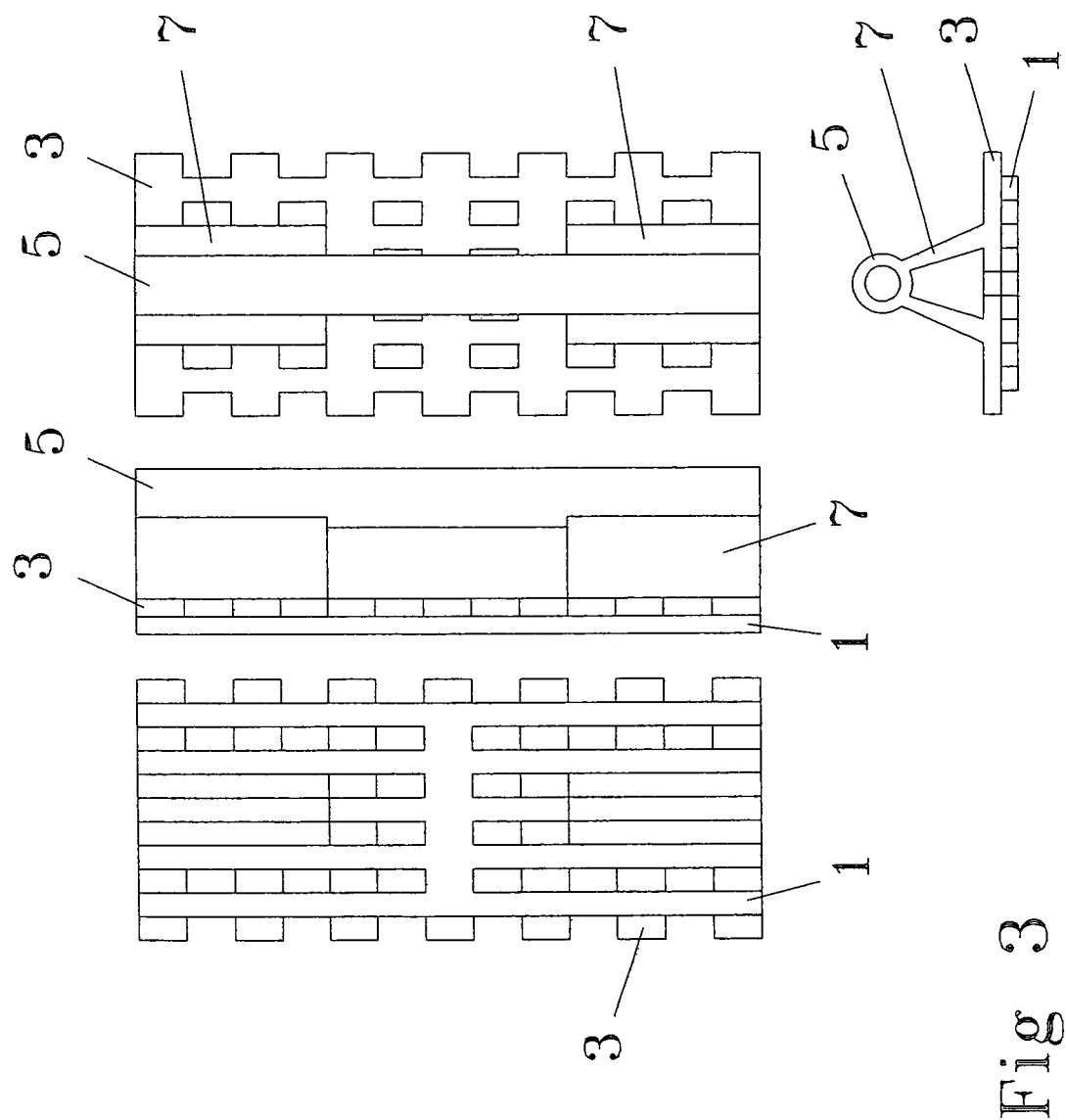
FIG. 3 shows the same in plan, side, underside and end elevations.

Referring first to FIGS. 1 to 3, a device is shown which comprises a generally planar bilayer of two polymeric materials (Thermo Plastic Elastomers—TPE's) with different water absorbency properties so configured that the structure tends to be generally flat when unwetted, but to become curved when wetted, and provided with a fluid tube on what is a concave side when wetted, so that the fluid tube is distorted and kinked in the wetted state.

The structure consists of a first web of relatively hygroscopic polymer (1), suitably selected from materials including a high moisture regain grade of TPE from the range of commercially available PEBAX® materials also referred to as Polyether Block Amides. A second web of relatively hydrophilic polymer (3) suitably selected from a low moisture regain TPE in the PEBAX® range or similar is, in this example, over moulded with the first web to produce a bilayer, with careful tool design the over-moulding process of plastic injection moulding lends itself to incorporating the cut-outs and perforation features (if these are required) evidenced in FIGS. 1, 2, 3, 4 & 6 during the moulding process itself. In an alternative process of manufacture more likened to fabrication as seen in the figures, the webs may first be cut, punched or perforated as desired. The two materials are bonded together to form a moisture sensitive element which tends to change in dimension and to flex, as is illustrated in FIGS. 1 and 2, when in the wetted state.

FIG. 3 illustrates the structure in an undeformed state, that is an unwetted state, and better shows the way the two layers interact. The figure illustrates the structure respectively (left to right) in plan view from below, in side elevation, in plan view from above, and in end elevation (bottom right).

With reference to FIGS. 1 to 3 an irrigation tube (5) again conveniently of suitable waterproof polymeric material such as a low moisture regain TPE, is supported on the moisture flexing member formed by the two layers via pairs of radial-like resilient extensions (7) of the web (3). These are of functional significance in the present embodiment, as in effect they, resiliently hold and restrain the irrigation tube close by each of its ends at a chosen distance away from the concave forming face of the moisture responsive web, they also relay and magnify a pincer action to concentrate the compressive forces generated by mechanically advantaged arrangement about the generally central region referred to as the kink zone (z) roughly at the mid point in the gap between them at which point (8) the irrigation tube (5) is most likely to form a kinked discontinuity as it is distorted as the perforated moisture-flexing member moves into a more wetted state. This is best illustrated in FIG. 1. At this kinked discontinuity, the irrigation channel defined by the bore of the tube (5) tends to be occluded by the kink, and irrigation fluid does not pass freely through this point.

FIG. 1 particularly, shows the value of the mechanical advantage gained from off-setting the irrigation tube from the moisture responsive element, in the embodiment the first web and second web combination. A flexibly resilient conduit tube member (in the example the irrigation tube (1)) is mounted several tube diameters out from the moisture responsive element, in the embodiment from the outermost side of the second web formation, for example about two to five tube diameters and in the illustrated embodiment about three. The conduit tube member is orientated and restrained by at least one pair of offset supports longitudinally spaced along the conduit tube member to space the conduit tube member away from the moisture responsive element in a generally transverse direction. Suitable supports are for example in the form of radial like extensions, (preferably, as in the figure, two pairs of radial extensions (7)).

This defines a kink formation zone located between the longitudinally spaced offset supports such as the opposing radial-like extensions. The conduit tube member is structured and fabricated from material so as to exhibit in compression a tendency to undergo local elastic buckling once a buckling load is applied and form a kink which tends to occlude the tube. The kink formation zone is a zone where the buckling effect tends to be focused and the effect is multiplied by the overall geometry directing the generated bending forces into a pincer action applied through each end of the conduit tube member.

As FIG. 1 illustrates, the use of a transverse offset can introduce a significant mechanical advantage in relation to bending forces introduced into an offset actuation member by a bending moisture responsive element. This advantage can accrue in relation to any elongate actuation member offset laterally from a moisture responsive element that tends to adopt a more concave curvature in a wetter state, such as is the case with the bilayer web in the embodiment. The advantage is especially useful when applied as an offset between a generally elongate actuation member which tends to occlude by buckling such as a conduit tube member and a generally sheet-like element such as a bilayer web which tends to curve at least in one direction to become concave on wetting. The elongate actuation member is offset laterally on the concave side. The effect of the longitudinally spaced offset supports is to define a kink zone therebetween of reduced extent (in a longitudinal direction) and so magnify buckling stresses in any tube relative to the radius of curvature applicable to the generally sheet-like element. This reduces the overall time taken to form a kink, as less curvature needs to develop in the moisture responsive element to form the kink. The longitudinally spaced offset supports are thus so structured as to define a kink zone of reduced longitudinal extent in an elongate actuation member and confer a correspondingly increased deformation of the actuation member for a given change such as a given degree of curvature in a deformed moisture responsive element. The development of only a relatively shallow degree of curvature in the moisture responsive element, may give rise to an effective kink of acute included angle in the actuation member. This may be evidenced as an included acute angle in the region of 50% smaller (tighter) than the lesser developed and still open included angle of the moisture responsive element.

In the embodiment the mechanical advantage of the offset accrues in that the curvature included angle of the web generates a kink in the tubular element with an included angle that is significantly less than the curvature included angle. In FIG. 1 the former is about 60° acute included and the latter about 120° open included, both from an initial dry straight state of 180° open included angle.

Ideally the conduit tube member and kink formation zone are structured such that one full kink can be formed generally in the middle of this zone and this occurs after only a couple of hours of contact with moisture. Without the mechanical advantage of the offset (i.e. with a conduit tube member mounted directly on the surface) this might be more like twelve hours. It is worth noting that when the conduit tube member and kink formation zone are ideally structured, as in the embodiment, the kink will preferentially form as shown.

As the wetting up process develops there is a progressive stretching and curling or bending of the moisture responsive member as the first material expands and in particular lengthens and the second material is stretched elastically by this. The second web of the moisture responsive element is stretched as it too curls inwards in association with the large scale external swelling of the first web, the moisture responsive polymer. The moisture responsive polymer will conveniently swell by several percent at least, and with appropriate material selection may swell by as much as 15 to 25%. For the process to be reversible many times the extension or stretching of the second (low moisture regain) material has to be sufficiently within the elastic limit so that no permanent set takes place.

By employing a flexible, resilient yet water-resistant second web material the process is fully reversible a great number of times.

The effectiveness, speed and reliability of operation is partly attributed to the fact that during the wetting up process and before the formation of a kink the conduit tube member experiences forces generally along its axis. Typically, the tube starts (i.e. is mounted such as to be at average to dry humidity) under neutral load or more preferably light tension. As the first material expands and the web element expands, forces are generated in the system in the form of tensile forces in the second material causing the web element to bend and producing compressive forces in the tube. The compressive forces in the tube build to a point where the tube buckles and the forces resisting the bending of the moisture responsive web member are diminished. By careful design and materials selection the device can be optimised such that in practice this buckling is likely to be a sudden transformation, so that the closure is in practice a bistable transition. From a gently curved appearance with the tube essentially open the valve suddenly snaps or flips into the shape in the figure. The motion can be readily observed and if the valve is laid out in a few millimeters depth of water, there is quite a rippling effect when this happens.

Two considerations contribute to the effectiveness of operation namely, the time to go from dry-straight to just before the wet-kinking (where there can be a curvature in the moisture responsive element but there is no significant restriction of flow through the tube), and the time to flip and form the kink. The mechanical advantage conferred by the offset enables the device to reach a kink point very much quicker, so time is only a couple of hours instead of say 12 hours. This is in part because the effect of curvature in the element is magnified, and in part because the offset also creates a focused kink zone. By contrast a tube mounted directly on an element surface would tend to require greater element curvature to reach a point where it might kink, and might tend to kink at multiple locations. The kink itself is rapid as the tube undergoes elastic buckling failure once the buckling load passes above a threshold. The bore is occluded.

The speed of response in the reverse direction is improved also so that there is less hysteresis or lag in opening again as conditions dry out. In particular, as the first material dries out and shrinks the second material is still under residual tension, whilst the elastic nature of the buckled tube also tends to urge the buckle to reverse rapidly once the buckling load passes below a threshold. The bore opens and water can flow again.

The effectiveness of the invention is not dependent on this phenomenon alone or in it occurring always in the blink of an eye. For a range of device sizes and/or materials the nature of the response can be tailored somewhat but the device should in all cases, when wetted-out as intended, form a viable kinked closure of the tube.

In use in an irrigation system, the device will be incorporated such that the irrigation tube (5) is fluidly connected into an irrigation hose (not shown) on a distributed irrigation system in the vicinity of a watering point, for example at the outflow of a tee'd off hose system. Irrigation fluid from a central supply reaching this point will pass through the bore unhindered if there is no kink present, when the vicinity is relatively dry. If the vicinity of the device is moist, the device will tend to a distorted state, and will tend to inhibit the through passage of irrigation fluid, acting as a closure at that point. Thus, the device of the invention effects an automatic closure via mechanical action. Thus, the device of the invention acts in practice as a valve effecting automatic and reversible partial or full closure of the irrigation conduit at the point where the device is inserted into an irrigation system.

Figure 4:
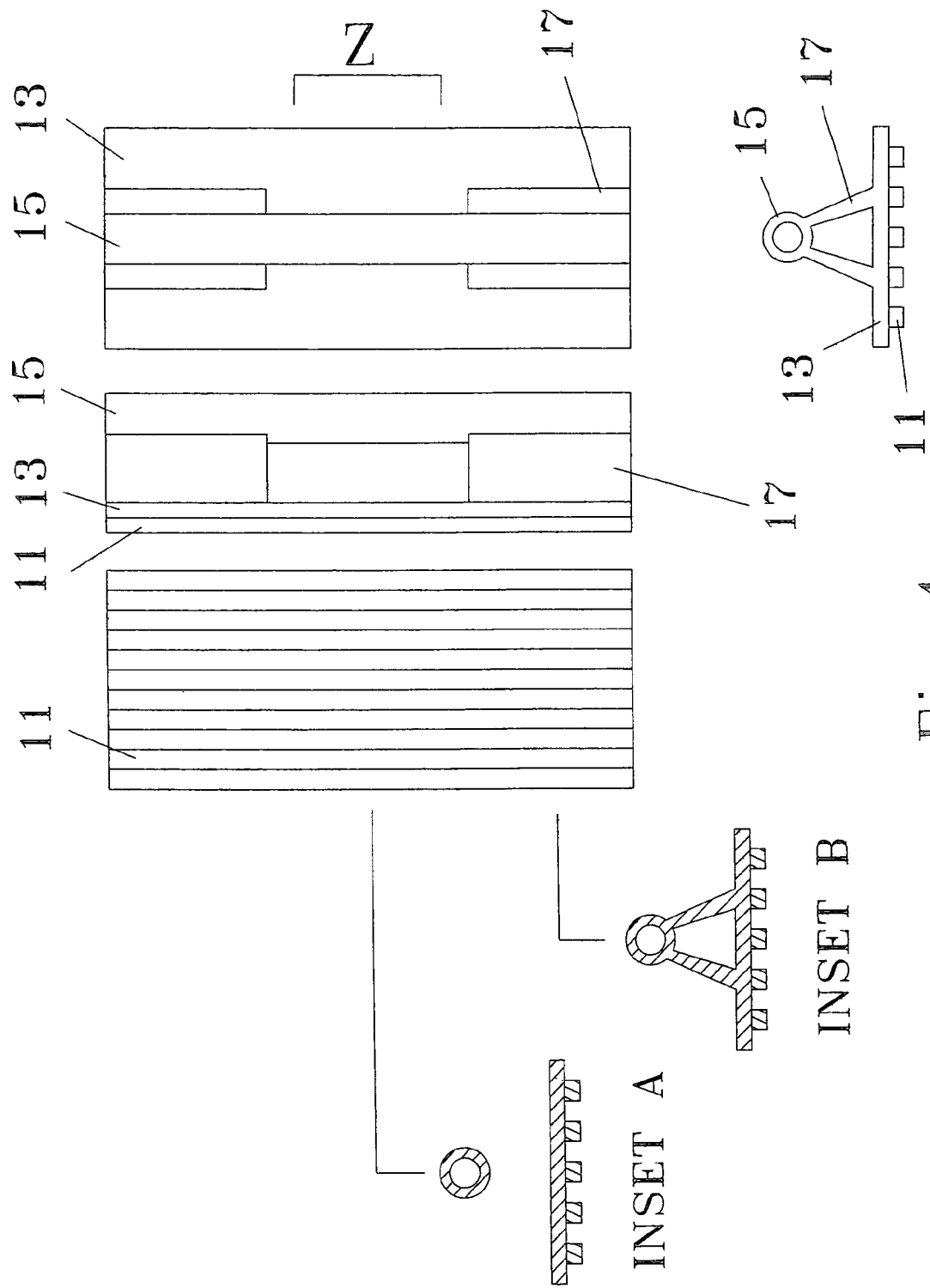
FIG. 4 shows an alternative embodiment in plan, side, underside and end elevations.

FIG. 4 illustrates an alternative embodiment which differs primarily in the method of manufacture, and is illustrated in the like manner to FIG. 3. Where FIG. 3 was produced by over-moulding of two polymer webs, it is intended that FIG. 4 would be suitable to be produced on a continuous basis by co-extrusion. Again, a lower web (11) of relatively hygroscopic material and an upper web (13) of relatively less hygroscopic material are formed in a bilayer, this time by co-extrusion, so as to provide a moisture-flexing member which operates in like manner to that illustrated in FIGS. 1 to 3. A resiliently flexible elongate polymeric irrigation tube (15) is again provided, again supported on paired radial like resilient extensions of the web (13). This arrangement lends itself to co-extrusion of a continuous length of material, which can then be further processed by having the surplus resilient extension material removed, e.g., by blanking and then cut to suitable lengths to form a number of discrete devices. The fundamental mode of operation is the same as before, with the supports (17) again serving to define a mechanically advantaged kink zone (z) at which the tube (15) is most likely to kink and become occluded in use.

FIG. 5 view (a) illustrates a possible mounting option in assembled side-on sectional view for a device of the invention. A mounting bracket (21) is shown with a ground support (22) and a conduit junction portion (23) defining part of an irrigation hose network. A device in accordance with the invention (24) is shown fluidly connected to an outlet of this conduit portion (23), referring here to both views (a) and (b). In use, the device (24) will tend to distort in the manner above described when it becomes wetted, with the free end curling in a generally upwards direction and away from any pooling of irrigation fluid, and thus effect a partial or complete fluid closure downstream of the outlet of the conduit (23) and, in the distorted state, interrupt any irrigation process. Thus, water supplied via the bracket and junction conduit (23) will only be delivered to the irrigation site when the device (24) is in a relatively unwetted state.

In FIGS. 1 to 4 the device of the invention is illustrated with the tube (5, 15) supported on pairs of radial or near radial resilient webs (7, 17). This is particularly effective, as it holds the tube in a relatively fixed position relative to the moisture-flexing element, and defines relatively precisely a zone where the tube is most likely to kink when the moisture flexing element is distorted. However, in an alternative embodiment it would be possible to provide a valve system in like manner but with the irrigation tube supported only on a single discontinuous radially extended web support. Such a system is not illustrated in the Figures, and will not generally be preferred as the forces are less likely to be ideally balanced in use, and the resultant kink will likely be thrown to the left or to the right of the central axis. This is less efficient as the kink takes longer to form and is a softer kink, but it does still confer some functionality.

A modified version of a device embodying these principles is shown in FIG. 6. Again four illustrations are given in like manner to FIGS. 3 and 4. A first relatively hygroscopic layer (31) is bonded with a second relatively less hygroscopic layer (33) as before to provide the moisture-flexing element. An irrigation tube (35) is this time supported by a single rather than a paired perpendicular extension of the layer (33), illustrated as a support (37), in particular by means of the broken line in the plan view from above. This suffers from the drawbacks indicated, namely that the kink will take longer to form, and it will form away from the shortest most effective path i.e. it will form to either one side or the other of the device where it is less constrained. To attempt to stabilise this so that the kink zone is more clearly defined in similar manner to that illustrated in FIGS. 1 to 4 further transverse flanges (38) are incorporated to give enhanced rigidity to the support for the tube (35). This is a possible solution for moulded structures, but is generally not preferred as it concentrates stresses in two regions where there are abrupt changes in geometry either side of where the kink is formed, and does not lend itself to co-extrusion. Although only two transverse flanges are shown in the illustrations additional flanges may be incorporated for improved stability, at or closeby each of the ends of the tube (35).

The above examples are all illustrative of moisture responsive irrigation control units, which function in effect as moisture actuated valves, in that distortion and dimensional change of the moisture-flexing element acts directly on the irrigation tube to effect at least partial closure thereof in a wetter condition by direct mechanically advantaged action. This is a particularly useful embodiment of the invention, in that it uses the direct mechanical effect to minimise moving parts. However, as has been discussed above, the principles of the invention, to make use of the mechanical action of the moisture-flexing element on an actuating element retained thereon, are not limited to such direct closure, and can extend for example to the fabrication of sensors and switches where the distortion generates some other form of mechanical, electromechanical or electrical response, either directly or indirectly, by the effect of the mechanical distortion of a suitable actuation member retained on and in association with the moisture flexing element.

What is claimed is:
1. A moisture responsive device comprising: a moisture responsive element comprising at least a moisture responsive first layer formation of a first material in association with a second layer formation of a second less moisture responsive material, wherein the first material has a greater tendency to absorb moisture and to increase in volume as a result more than the second material, and wherein the second material is resiliently deformable and the first and second layer formations are mechanically arranged together so that such differential change in volume of the first layer formation with respect to the second layer formation causes mechanical deformation of both of the first and second layer formations between a less curved state and a more curved state; and an actuation member in mechanical association with the moisture responsive element so that the deformation of both of the first and second layer formations in the presence of moisture between the less curved state and the more curved state causes the actuation member mechanically to change between at least a first conformational state and a second conformational state and thereby cause the actuation member to change between at least a first functional state and a second functional state.

2. The moisture responsive device in accordance with claim 1 wherein the actuation member is formed of flexibly resilient material such that the deformation of the moisture responsive element tends to distort the actuation member.

3. The moisture responsive device in accordance with claim 1 wherein the actuation member is so configured that its distortion between at least the first functional state and the second functional state is such as to effect a functional change directly within the actuation member.

4. The moisture responsive device in accordance with claim 3 wherein the actuation member includes an operable closure formation to comprise a moisture actuated closure for a fluid conduit system wherein the functional change effects selective operation of the operable closure formation.

5. The moisture responsive device in accordance with claim 4 wherein the actuation member itself comprises at least in part the moisture actuated closure so that the functional change directly effects, at least in part, operation of the operable closure formation.

6. The moisture responsive device in accordance with claim 5 wherein the actuation member is a flexibly resilient conduit member serving as a portion of a fluid transfer conduit which is directly deformable as the moisture responsive element deforms to introduce directional changes including bends or kinks into the flexibly resilient conduit, and thereby to tend to occlude a fluid channel within the conduit and so inhibit fluid flow therealong.

7. The moisture responsive device in accordance with claim 5 for regulation of irrigation wherein the first layer formation is in direct mechanical association with the second layer formation; and wherein the actuation member comprises a fluid conduit of flexibly resilient material in such mechanical association with the moisture responsive element that deformation of the moisture responsive element in the presence of moisture tends to mechanically distort the fluid conduit to introduce one or more kinks therein and thus to inhibit fluid flow.

8. The moisture responsive device in accordance with claim 5 wherein the actuation member comprises a flexibly resilient tubular member with a tube bore acting as a passage for irrigation fluid in use and the device is so constructed that the tubular member lies generally straight in a generally dry and open-bore state, but is caused to become kinked, resulting in at least partial closure of the bore, under the mechanical action of the moisture responsive element as the more moisture absorbent first material swells.

9. The moisture responsive device in accordance with claim 1 wherein the first material is a relatively hygroscopic material, and the second material is a relatively less hygroscopic material.

10. The moisture responsive device in accordance with claim 1 wherein the second material is a relatively hydrophobic material.

11. A moisture responsive device in accordance with claim 1 wherein at least the second material is resiliently deformable.

12. The moisture responsive device in accordance with claim 1 wherein the first and second materials are mechanically engaged together directly by a shared bonded surface.

13. The moisture responsive device in accordance with claim 12 wherein the two materials are bonded via a melt forming process.

14. The moisture responsive device in accordance with claim 1 wherein the moisture responsive element has a generally flat structure, with the first and second materials being so arranged that the moisture responsive element tends to deform between a generally less curved formation in an unwetted state and a generally more curved formation as it is wetted.

15. The moisture responsive device in accordance with claim 14 wherein the moisture responsive element is adapted to deform between a generally planar formation in an unwetted state and a generally curved formation as it is wetted.

16. The moisture responsive device in accordance with claim 14 wherein the actuation member is mechanically engaged upon but laterally distanced from the moisture responsive element by lateral engaging projections.

17. The moisture responsive device in accordance with claim 16 wherein the longitudinally spaced engaging projections are longitudinally spaced and structured so as to define a kink zone in the actuation member and produce in such a zone an increased deformation of the actuation member for a given deformation in the moisture responsive element.

18. The moisture responsive device in accordance with claim 14 wherein the first layer formation and the second layer formation comprise webs disposed alongside one another and bonded directly together at a common surface, such that the increased tendency of the first material to absorb water and increase in volume will tend to leave the first material, in the distorted and extended wetted state, on a convex side of the said curved surface, and the second material on a concave side of the said curved surface, and wherein the actuation member is placed in mechanical association with a surface of the moisture responsive element which is such as to distort to be the concave surface during use.

19. The moisture responsive device in accordance with claim 18 wherein the actuation member is a conduit member comprising a flexibly resilient tubular member mechanically engaged upon but transversely distanced from the said surface by means of at least one pair of longitudinally spaced lateral engaging projections.

20. A moisture responsive sensor comprising: a moisture responsive device in accordance with claim 1 and means to generate a moisture responsive signal on actuation of the actuation member.

21. A moisture responsive switch comprising: a moisture responsive device in accordance with claim 1, an operable switch and, a means to open and close the switch selectively on actuation of the actuation member.

22. A moisture responsive valve comprising: a moisture responsive device in accordance with claim 1, an operable valve closure, and a means to open and close the valve selectively on actuation of the actuation member.

23. An irrigation system including a plurality of moisture responsive valves in accordance with claim 22.

24. A method of detecting and/or responding to changes in moisture levels in situ in an environment comprising the steps of: disposing at least one moisture responsive device, wherein the moisture responsive device includes a moisture responsive element comprising at least a moisture responsive first layer formation of a first material in association with a second layer formation of a second less moisture responsive material, wherein the first material has a greater tendency to absorb moisture and to increase in volume as a result more than the second material, and wherein the second material is resiliently deformable and the first and second layer formations are mechanically arranged together so that such differential change in volume of the first layer formation with respect to the second layer formation causes mechanical deformation of both of the first and second layer formations between a less curved state and a more curved state; and an actuation member in mechanical association with the moisture responsive element so that the deformation of both of the first and second layer formations in the presence of moisture between the less curved state and the more curved state causes the actuation member mechanically to change between at least a first conformational state and a second conformational state and thereby cause the actuation member to change between at least a first functional state and a second functional state, in an environment as part of a system designed to monitor and/or control moisture levels in the environment; operating the system over time in such manner that as changes in the moisture levels actuate a change of state in the device, a response is generated in the system.

25. A method of controlling an irrigation system comprising providing an irrigation system comprising a network of irrigation hoses fed from an irrigation fluid source or modifying such a network already existing in situ; incorporating into the network, in particular in the vicinity of one or more irrigation fluid delivery points, at least one moisture responsive device, the moisture responsive device comprising at least a moisture responsive first layer formation of a first material in association with a second layer formation of a second less moisture responsive material, wherein the first material has a greater tendency to absorb moisture and to increase in volume as a result more than the second material, and wherein the second material is resiliently deformable and the first and second layer formations are mechanically arranged together so that such differential change in volume of the first layer formation with respect to the second layer formation causes mechanical deformation of both of the first and second layer formations between a less curved state and a more curved state; and an actuation member in mechanical association with the moisture responsive element so that the deformation of both of the first and second layer formations in the presence of moisture between the less curved state and the more curved state causes the actuation member mechanically to change between at least a first conformational state and a second conformational state and thereby cause the actuation member to change between at least a first functional state and a second functional state and further comprising a valve actuator so adapted as to tend to inhibit fluid flow in response to increased moisture levels; operating the irrigation system as desired by supplying irrigation fluid from the source to the network of hoses.

26. The method of claim 25 wherein the actuation member comprises a fluid conduit of flexibly resilient material in such mechanical association with the moisture responsive element that distortion of the moisture responsive element in the presence of moisture tends to mechanically distort the fluid conduit to introduce one or more kinks therein and thus to tend to inhibit fluid flow at higher moisture levels.

27. The method of claim 26 wherein the fluid conduit is laterally offset from a moisture responsive element having a generally flat structure such as to tend to curve in the presence of moisture by means of longitudinally spaced engaging projections spaced and structured so as to define a kink zone in the actuation member and produce in such a zone an increased deformation for a given deformation in moisture responsive element.

* * * * *